Patented Aug. 29, 1950

2,520,716

UNITED STATES PATENT OFFICE 2,520,716

METHOD OF SEPARATING ORGANIC COMPOUNDS BY FORMING SOLID COMPLEXES

Lloyd C. Fetterly, Seattle, Wash., assignor to Shell Development Company, San Francisco, Calif., a corporation of Delaware No Drawing. Application November 28, 1947, Serial No. 788,693

10 Claims. (Cl. 260—676)

This invention relates to a process for the extractive fractionation of organic compounds. More particularly, it relates to improvements in the process of fractionally separating organic compounds from mixtures thereof by the use of such complex-forming agents as urea and thiourea. In a more particular application of the invention, it is directed to an improved process for the separation of hydrocarbons from mixtures thereof by fractional crystallization of some of the hydrocarbons with agents which are capable of forming solid complexes with at least a portion of said hydrocarbons.

The fractionation of many mixtures of organic compounds presents numerous problems, both technical and economic. This is particularly true in the case of mixtures of compounds which have relatively close boiling points and which are also relatively closely related in a chemical sense. For example, the separation of mixtures of closely allied isomers, such as of n-octane from admixture with iso-octane, is difficult by any of the more reasonably economic procedures. Although their freezing points differ by an amount which would make it technically feasible to separate them by a process based thereon, the economics of such a process would not permit its commercial utilization at the present time. Similarly for mixtures of other isomeric hydrocarbons, such as of n-pentane and iso-pentane, and the like.

Heretofore, the two principal means utilized for fractionation of such mixtures on a commercial scale have been by fractional distillation and by solvent extraction, or by combinations of the two, such as in azeotropic and extractive distillations. Recently, however, a new method has been shown to be suitable for large scale separations of closely related organic compounds, namely, extractive crystallization with agents such as urea and thiourea which are capable of selectively forming solid complex materials with certain individual substances or classes of substances in the mixture. Thus, it is known that urea forms crystalline complexes with organic compounds of substantially normal structure, while it appears to be inert in this respect toward branched compounds such as the isoparaffins and toward most cyclic compounds such as aromatics and naphthenes. It has also been found, as disclosed in applicant's copending application, Serial No. 730,182, Patent No. 2,499,820 filed February 21, 1947, that thiourea forms crystalline complexes with organic compounds of other than a normal structure, particularly of branched-chain acyclic and of alicyclic structures. It is also known, as disclosed in copending application of Sigurd Groennings, Serial No. 765,809, filed August 2, 1947, that selenourea and tellurourea form crystalline complexes with various organic compounds. The study of the complexes so formed indicates that they are unstable molecular complexes rather than true chemical reaction products. This is indicated by their unstable character and the consequent ease of the regeneration of their components, namely, the urea, thiourea, selenourea or tellurourea and the unaltered organic compound.

Processes based upon the preparation of these complexes are particularly applicable to the refinement of petroleum or other hydrocarbon mixtures, especially those of unbranched structure (which may be suitably fractionated by complex formation with urea) or hydrocarbons of branched chain or of alicyclic structure (which readily form complexes with thiourea). The general procedure utilized heretofore has been to treat the mixture of organic compounds with a solution of the complex-forming agent in water or a lower molecular weight alcohol such as methyl and ethyl alcohols. Under these circumstances a mixture of complexes usually was formed. This was due to the characteristics of the complex-forming agent whereby under a given set of operating conditions a certain class of compounds formed complexes with the agent present. Thus, if both isoparaffins and naphthenes were present in a mixture of hydrocarbons with normal paraffins, the treatment of such a mixture with thiourea resulted in the formation of solid complexes of both the isoparaffins and the naphthenes with thiourea.

The rate of formation of the crystalline complexes by the processes as known and practiced heretofore has varied from an almost instantaneous action or reaction—not used in the sense of a chemical reaction—with some individual substances to a relatively slow rate with other substances where the time for visible formation of solid complex material has been in the order of several hours or more. That is, in many cases, there is an induction period between the time of first contacting the substances to be reacted and the time of first visible formation of solid complex material. In the case, for example, of hydrocarbons of normal structure and having less than six carbon atoms per molecule, it has been considered that no solid complex could be formed, a minimum of six carbon atoms per molecule being considered as a prerequisite for crystalline complex formation with the agent. Expressed in terms of an induction period, it could be said that by prior processes the induction period for the formation of a crystalline complex of urea and a normal hydrocarbon of less than six carbon atoms is of the order of hours or days and even possibly approaches infinity. In most processes, the time factor is very important and very often may be the factor which determines whether a given process is economically and/or technically feasible for commercial utilization.

It is a principal object of this invention to provide an improved process for the formation of solid complex materials from organic compounds and complex forming agents. A further object is to provide an improvement in the process of forming solid complexes from organic compounds and complex-forming agents of the character of urea, thiourea, selenourea and tellurourea. Another object is to provide a more efficient and economic process for the formation of solid complexes from hydrocarbons and complex-forming agents such as urea, thiourea, selenourea and tellurourea. Still another object is to effect the formation of solid complexes from hydrocarbons containing less than six carbon atoms per molecule and complex-forming agents of the above-indicated character. It is a still further object of this invention to reduce the induction periods of the formation of solid complexes from organic compounds and the complex-forming agents listed above. It is also an object to provide a more efficient and economic process for the separation of mixtures of hydrocarbons by the process of contacting such mixtures with complex-forming agents as named above. These objects will be better understood and other objects will become apparent from the following description of the invention.

Now, in accordance with this invention, it has been found that the formation of solid complexes between agents represented by the formula

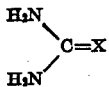

wherein X is O, S, Se or Te (urea, thiourea, selenourea and tellurourea), with organic compounds, and the separation of the organic compounds thus converted into solid complexes from other organic compounds admixed therewith, may be improved by conducting the complex formation in the presence of a particular class of contacting agents which has not been utilized heretofore in the process and which comprises non-aquo substances which are characterized by having at least a partial solubility for the complex-forming agent and a relatively low solubility (substantial immiscibility) for the complex-forming organic compound as well as a low solubility for the complex. In general, such substances are also characterized by being highly polar selective solvents for aromatic hydrocarbons over non-aromatic hydrocarbons. By this improvement it is possible to more effectively and efficiently effect the separation of mixtures of various organic compounds, particularly of different types of hydrocarbons, by the selective extraction and crystallization by solid complex formation of certain components of the mixtures with complex-forming agents as named hereinbefore.

Described broadly, the process of the present invention is carried out by contacting a mixture of organic compounds, only some of which are capable of forming solid complexes with an agent selected from urea, thiourea, selenourea and tellurourea, with the selected complex-forming agent as named above, in the presence of a non-aquo substance which in the liquid or liquefied state is at least a partial solvent for the selected complex forming agent and is substantially a non-solvent for the complex-forming compounds in the mixture, thereby producing a solid complex of the agent with the complex-forming organic compounds of the mixture, and separating the resulting solid complex from the remaining organic compounds. The separated solid complex is then treated to resolve it into the agent and the complex-forming organic substance(s) thereof (other than the agent) and said organic substance is recovered as such, or the solid complex is utilized directly for the preparation of derivatives of the organic substance portion thereof.

In carrying out the process of the present invention, as applied in a more limited scope thereof, mixtures of organic compounds, for example, mixtures of at least two types of hydrocarbons such as of normal paraffinic hydrocarbons, iso-paraffinic and/or alicyclic hydrocarbons in admixture with other hydrocarbons, which may or may not include aromatic hydrocarbons, are contacted with a complex-forming agent selected from urea, thiourea, selenourea and tellurourea and mixtures thereof, in the presence of a liquid or liquefied contacting agent which possesses at least a slight solvency power for the complex-forming agent and which is substantially immiscible with the compound or compounds with which it is desired to form the solid complex and which contacting agent is also a non-aquo substance, that is, it is neither aqueous nor alcoholic, the term "aquo" being used to mean hydrogen hydroxide and hydrocarbon hydroxides. Following the formation of the organic compound-agent solid complex admixed with the solvent or contacting agent and the unchanged other organic compound or compounds, the entire mixture is then passed to a suitable settling vessel wherein phase separation and stratification occur, with the mixture settling and/or stratifying into two or more phases, depending on the exact nature of the mixture of organic compounds and the particular solvent (contacting agent) utilized in the process. For example, if the mixture being treated consists only of normal and iso-paraffinic hydrocarbons, the complex-forming agent is urea and the solvent is liquid sulfur dioxide, the resulting mixture will separate into three layers, namely, a lower layer of the crystalline complexes between the normal paraffinic hydrocarbons with urea, an upper layer of the iso-paraffinic hydrocarbons constituting a raffinate phase and an intermediate layer which is the sulfur dioxide solvent containing unchanged urea. After this phase separation, the three phases are recovered, each from the others, such as by filtration or centrifugal separation of the crystalline complexes and decanting of the immiscible iso-paraffin raffinate phase from the solution of urea in the solvent. In the case of a mixture of normal paraffinic hydrocarbons and aromatic hydrocarbons, using urea as the complex-forming agent and liquid sulfur dioxide as the solvent, only two layers are formed, namely, a lower layer of the precipitated complex of normal paraffin and urea and an upper layer of the sulfur dioxide and unprecipitated urea and dissolved therein the aromatic hydrocarbons. After separation of the solid complex from the sulfur dioxide extract of the aromatic hydrocarbons, the aromatic hydrocarbons may be recovered by any suitable means. For example, the sulfur dioxide may be flashed or distilled off and the resulting precipitated urea may be separated by filtration.

In another embodiment of the invention, the mixture of substances to be separated, for example, a mixture of straight-chain and non-straight-chain hydrocarbons, is contacted with the complex-forming agent, for example urea, in the solid state while maintaining thereabout an atmosphere of the contacting agent. The mixture of substances to be separated may be in a gaseous state or in a liquid state during the contacting operation. Accordingly, the contacting agent may be admixed with said mixture as a gaseous or vaporous substance or it may be present in the liquid phase. In either case, the contacting agent may be maintained in an adsorbed state on the agent and/or any inert solid physical adsorbent with which the solid agent may be admixed for purposes of dilution thereof.

For the purpose of simplifying terminology, hereinafter in the specification and in the claims the terms "solvent," "selective solvent," "solvent media" and terms of like import as used with reference to sulfur dioxide and other substances which are used for the same purpose in the invention, as disclosed more completely hereinafter, will be used for the purpose of identification of such substances, based on properties in the liquid state, but will not imply that the substances are to be utilized only in the liquid state, since they may be utilized also in the gaseous state in admixture with the organic substances in gaseous or vaporized state or the solvent may be adsorbed on the complex-forming agent while the latter is maintained in a solid state, either alone or physically admixed with inert solids such as well known solid physical adsorbents.

The contacting agent, which for purposes of identification may be termed a selective solvent, to be utilized in the practice of the invention should have the properties in the liquid or liquefied state of being at least a partial solvent for (as distinguished from chemical reaction with) the complex-forming agent or agents, of being substantially a non-solvent for the component or components of the mixture with which it is desired to form the solid complexes and also a non-solvent for the complexes and it should be non-aqueous and non-alcoholic, that is, it should be neither a hydrogen hydroxide nor a hydrocarbon hydroxide. In general, such substances which are suitable as contacting agents for the practice of the invention possess a decided selective solvency power for aromatic hydrocarbons over non-aromatic hydrocarbons. Many of the solvents which have been found to be most effective in the process of this invention are those liquid substances which are considered to exhibit acidic character in the anhydrous state or in non-aquo systems. Accordingly, this class represents a preferred class of solvents in the practice of the invention. Representative substances of this class are liquid sulfur dioxide, liquid carbon dioxide, liquid ammonia (as a liquid it liberates hydrogen when reacted with alkali metals such as potassium and sodium), boron trifluoride, liquid hydrogen fluoride, stannic chloride, nitrogen dioxide (tetroxide), antimony trichloride, arsenic trichloride, arsenic trifluoride, antimony trifluoride, phosphorus oxychloride, nitrogen trifluoride, etc. As further representative of the broader class of solvents, namely, those which are highly polar and exhibit a decided selective solvency power for aromatic hydrocarbons over non-aromatic hydrocarbons, there are sulfolane, dimethyl sulfolane, other lower alkyl sulfolanes having not more than about 7 carbon atoms, furfural, nitromethane, nitroethane, acetonitrile, acrylonitrile, propionitrile, acetic anhydride, thiophene, thienyl aldehyde, pyridine, pyrrole, etc.

The conditions of temperature and pressure, the particular solvent, the ratio of solvent-agent combination (solution) to the mixture of organic compounds being treated, the ratio of agent to organic compound or compounds to be precipitated as complexes, and the like, to be selected for application of the invention in any given case are all more or less related and must be correlated. In general, it is advantageous, although not always required, to effect the treatment with the complex-forming agent under conditions where the solvent is substantially saturated with respect to the agent. In many cases it is advantageous to have present excess of the complex-forming agent in the solid state, particularly when its solubility in the contacting agent is small. Consequently, when the urea or like agent is to be dissolved the actual ratio of agent to solvent depends on the solubility of the agent in the given solvent at the particular temperature employed. On the other hand, it is advantageous to effect the treatment with a high concentration of the agent, therefore, requiring a correlation between the temperature to be used and the solvency power of the solvent for the agent. The correlation which should be made in this respect may be generalized by stating that the factors involved should be selected or adjusted so as to at least approach near to or to exceed a condition at which the agent tends to separate as a solid crystalline phase even in the absence of other materials. Concentrated solutions are desirable if the solubility relationships and operating conditions permit it. This last-mentioned correlation, however, must be made in consideration of still another factor, namely, what may be termed the escaping tendency of the organic substance with which it is desired to form the solid complex, from a material in which it exists in a crystalline form, which escaping tendency is related at least in a qualitative sense with the vapor pressure of the substance under the given conditions of temperature and when associated with the same solvent. Thus, when the substance with which it is desired to form a solid complex is, for example, a hydrocarbon such as normal butane, which has a relatively high vapor pressure at normal atmospheric temperatures, it has been found advantageous to effect the treatment with urea as the complex-forming agent, dissolved for example in liquid sulfur dioxide, and admixed therewith at a temperature of the order of the freezing point of water, namely, at about 0° C. Although for complete crystallization of all of one type of compounds it is generally preferred to use a saturated solution of the agent, a fractionation may be effected between various members of a given type of compounds (normal paraffin hydrocarbons) in a mixture thereof by adjusting the concentration of the agent in the solvent to give a desired selective crystallization. Similar fractionations may be effected by judicial selection of the operating temperature. As already discussed, different organic compounds and different complex-forming agents, with various combinations thereof, may be utilized within the scope of this invention. It will be understood that the solvency power of a given solvent for one given complex-forming agent may be considerably different from its solvency power for another complex-forming agent, under the same conditions of temperature and pressure, and therefore, the optimum temperature of operation when using one agent may not be the optimum temperature for effecting the treatment when using another agent. The manner of correlating the various factors will be understood from the foregoing discussion thereof and the further description of certain of these factors as made hereinafter.

The ratio of the complex-forming agent to active organic compounds will vary with the type of mixture to be treated and with the conditions of complex formation, as well as the desired separation, all as discussed hereinbefore. For example, the extractive fractionation may be carried out with the intention of removing from the mixture the maximum amount possible of the compounds of normal structures present. In this particular case, it is preferred practice to contact the mixture with urea employed in an amount in excess of that necessary for complete complex formation. The complexes formed may have varying amounts of the complex-forming agent combined per molecular proportion of the active organic compound. In general, at least for the purpose of determining the amount of agent to be used for a particular case, it may be considered that the average ratio of urea or other agent molecules per carbon atomic proportion in the linear or equivalent part of the organic compound to be converted to the complex is of the order of about unity. That is, of the order of one molecule of the agent is present in the solid complex for each carbon atom or its dimensional equivalent in the linear part of the organic compound molecule.

The formation, separation and purification of the complexes having been accomplished as described hereinbefore, there remains the step of decomposing the complexes in order to recover the active organic compounds present therein. While a number of methods have been found for effecting such a decomposition or regeneration, the following methods have been found to be the most satisfactory for use when carrying out the process of the present invention:

A. Simple distillation.
B. Steam distillation.
C. Application of a solvent for the complex-forming agent, which may be simply a sufficiently large proportion of the solvent already utilized in the treatment to effect the formation of the solid complex.
D. Heating.
E. Pressure reduction in the case of volatile solvents with organic compounds which are substantially less volatile than the solvent.
F. Application of a solvent for a particular fraction of the regenerated organic compounds, especially where more than one agent has been used at the same time to form solid complexes with more than one type of organic compound.

The complexes, as has been pointed out hereinbefore, are relatively unstable formations, the exact nature of which has not been deduced. It has been found that due to their unstable character, splitting into the component parts of the complex may be readily accomplished, the complex-forming agent and the organic compounds in complex combination therewith being separately recovered in their original state.

By subjecting the complexes to distillation simultaneous destruction of the complex and fractionation of the organic compounds regenerated therefrom may be accomplished. The distillation may take place under normal or reduced pressures and the temperature and pressure so adjusted that the complexes are readily destroyed and the compounds regenerated therefrom are distilled into fractions which can be utilized for the purposes considered herein. For example, if it is desired to enrich the feed with low boiling normal hydrocarbons, complexes of urea and a mixture of normal hydrocarbons may be decomposed by distillation and the distillate may be recycled to the treating step.

A further type of regeneration comprises addition of a solvent for the complex-forming agent, which may be a further amount of the already-used solvent or an entirely different solvent such as water or alcohol, to the complex and the application of heat to facilitate the regeneration, if desired.

Another type of regeneration comprises the addition of a solvent for one or more fractions of the organic compounds to be regenerated from the complexes. When such a mixture is heated the complex decomposes, thus regenerating the organic compounds and complex-forming agents and, in the presence of such a solvent, a solution of part of the regenerated organic compounds is formed and may be readily separated from the insoluble fraction or fractions which are present. Hence, fractionation according to solubility may be readily accomplished.

In the case of the more volatile solvents, such as sulfur dioxide, ammonia and nitrogen dioxide, a reduction of the pressure on the system may be used to withdraw the solvent while simultaneously breaking-down the complex. This may be applied to separated complex with adhering solvent as well as to the mixture obtained from separating the unreacted organic compounds from the solvent-agent solution and solid complex together. In this connection, it is to be noted that an additional advantage to be gained in the use of such solvents as these, in addition to the great advantage of a substantial reduction in the induction period for the formation of the complexes, is the advantage of being able to effect cooling of the solvent-agent solution to maintain substantial saturation of the agent therein during the formation of the complex, by the expedient of reducing the pressure on the system and allowing a portion of the solvent to evaporate thus producing a refrigerating effect, and one which is rapidly and substantially uniformly transmitted throughout the body of the solvent.

As already indicated hereinbefore, the mixtures of organic compounds which may be treated with urea by the process of the present invention comprise compounds having substantially normal structure and compounds having a predominating substituent of substantially normal chain structure. Conditions may be employed whereby certain normal organic compounds are separated from other normal organic compounds, or from other organic compounds such as isoparaffins, aromatics, naphthenes, etc. The organic compounds of normal structure which may be formed into complexes by the process of the present invention include both saturated and unsaturated compounds, especially the saturated paraffins and olefins. The normal compounds may be of a number of types, such as hydrocarbons, alcohols, ketones, aldehydes, esters, amines, amides, sulfides, disulfides, mercaptans, acids, halogenated compounds, ethers, etc. The hydrocarbons respond especially well to the process of the present invention.

Suitable hydrocarbons which form crystalline complexes with urea by practice of the present invention include the paraffinic hydrocarbons such as butane, pentane, hexane, heptane, octane, nonane, decane, undecane, dodecane, tridecane, tetradecane, pentadecane, hexadecane, heptadecane, octadecane, nonadecane, eicosane, etc. Corresponding olefins, diolefins, polyolefins, acetylenes, olefin-acetylenes, etc., also form crystalline complexes with urea in accordance with this invention.

Normal alcohols, especially those having three or more carbon atoms, may be treated by the present process to form complexes with urea. These include the normal aliphatic monohydric alcohols such as butyl alcohol, amyl alcohol, hexyl alcohol, heptyl alcohol, octyl alcohol, nonyl alcohol, decyl alcohol, dodecyl alcohol, cetyl alcohol, carnaubyl alcohol, and the polyhydric alcohols, such as ethylene glycol, diethylene glycol, propylene glycol and hexitol. Corresponding aldehydes, ketones, esters, acids, amines, amides, nitro-paraffins, and their thio-analogs may also be treated according to the process of the invention.

As already indicated hereinbefore, hydrocarbons which form complexes with thiourea are those having a predominating member which is a substantially branched radical or a naphthene radical, such as alkaryl hydrocarbons wherein at least one alkyl group is an isoparaffin radical. In addition to the non-straight chain hydrocarbons which form complexes with thiourea many derivatives thereof also form complexes with thiourea. Since the formation of these complexes appears to be dependent on the relationships between unit cell dimensions of the agent and of the organic compound in question, including their shapes and sizes, it is not to be expected that thiourea will form solid complexes with all non-straight chain hydrocarbons and their derivatives. However, in order to show the broad scope of the applicability of the invention, the following representative substances are listed as having been demonstrated to form solid complexes with thiourea: chloroform, methylchloroform, bromoform, tetrachloroethylene, ethylidene chloride, trimethylene bromide, carbon tetrachloride, hexachloroethane, tertiarybutyl chloride, ethylene dibromide, sec-butyl bromide, n-propyl iodide, ethylene chlorohydrin, isopropyl iodide, chlorocyclohexane, bromocyclohexane, bornyl chloride, cyclohexanol, cyclohexanone, borneol, cyclohexylamine, p-methylcyclohexanol, 1,3-cyclohexenone, menthane, piperitone, pulegone, fenchone, thujone, camphor, methylisobutyl ketone, methyl-n-propyl ketone, methylisopropyl ketone, mesityl oxide, diisopropyl ketone, diethyl ketone, nitrobenzene, chlorobenzene, dicyclopentadiene and ethyl oxalate.

As already referred to hereinbefore, the co-pending application of Sigurd Groennings, Serial No. 765,809 discloses the formation of solid complexes between various organic compounds, particularly hydrocarbons, and selenourea and tellurourea analogous to the formation of complexes between various organic compounds and urea and thiourea as already discussed. The selenourea and tellurourea agents are particularly versatile in their capacity, forming complexes with a wide variety of organic compounds, especially with hydrocarbons. Furthermore, they are remarkable for their ability to form complexes with compounds of diverse configurations, such as normal paraffins, iso-paraffins, naphthenes, olefines, aromatics, etc., and derivatives thereof, including alcohols, aldehydes, ketones, acids, esters, amines, amides, sterols, hormones, cardiac poisons, saponins, carbohydrates, terpenes, phenols, sulfides, mercaptans, ethers, nitro-compounds, silicones, etc.

The separation of normal paraffinic hydrocarbons from non-straight chain paraffinic hydrocarbons by utilizing the improved complex-forming operation of this invention may be coordinated with a usual solvent extraction process for aromatic hydrocarbons to give an effective and economical process for the separation of mixtures of normal paraffins, iso-paraffins (including cycloparaffins) and aromatic hydrocarbons. For example, a mixture of benzene, cyclohexane and n-heptane may be treated with liquid sulfur dioxide thereby separating the benzene as an extract in the sulfur dioxide. The raffinate may then be contacted with thiourea in the presence of sulfur dioxide thereby forming a cyclohexane-thiourea solid complex and obtaining a raffinate therefrom which is enriched in n-heptane. Alternatively, the mixture may be admixed with solvent proportions of liquid sulfur dioxide (for the benzene) and the admixture caused to flow through a body (layer, fluid mass, etc.) of thiourea, thereby forming a complex with the cyclohexane and the remaining fluid mixture then separated into an extract phase of sulfur dioxide and benzene and a raffinate phase of n-heptane. In this manner the same sulfur dioxide is utilized for both purposes, namely as a promoter for complex formation and as the aromatic selective solvent.

The improvements in the process resulting from the use of the solvents in accordance with this invention are demonstrated in the following examples which are illustrative but are not intended to limit the invention thereto.

EXAMPLE I

Five different samples of hydrocarbons were treated separately, with agitation, with urea dissolved in and admixed with liquid sulfur dioxide in a closed pressure vessel. The proportions were of the order of 1 part by weight of hydrocarbon to 3 parts by weight of urea to 11 parts by weight of sulfur dioxide. All treatments were carried out in an ice bath at 32° F. The results are tabulated in the table.

*Table*

| Sample | Hydrocarbon Composition | Observations |
|---|---|---|
| 1 | A 70 cetane number reference fuel. | Instant reaction—mass turned solid almost immediately. |
| 2 | Straight-run gasoline having a 10%/90% boiling range of 290° to 415° F. | Instant reaction—fluid mass—easily filterable complex. |
| 3 | Normal heptane. | Instant reaction with the formation of crystalline complex. |
| 4 | A $C_5$ to 310° F. end point boiling straight-run distillate fraction. | Instant reaction—excellent crystalline complex formation. |
| 5 | A 95% normal butane hydrocarbon fraction. | Rapid reaction with the formation of crystalline complex. |

The use of solvents such as water and methyl alcohol in similar experiments did not produce reactions with the light gasoline and lighter fractions at the same temperature, or even at considerably lower temperatures except after extended induction periods.

After separation of the crystalline complexes from the unchanged hydrocarbons and from the solvent and unchanged urea in the above cases, the complexes were readily separated into the individual constituents thereof by the addition of water, the hydrocarbon separating as a water-insoluble upper layer and the urea dissolving in the water. Heating facilitated the destruction of the complexes, particularly in the case of the higher molecular weight hydrocarbons. The complexes may also be resolved into their components simply by heating in the absence of water, particularly in the case of complexes of lower molecular weight hydrocarbons.

EXAMPLE II

When the treatments of Example I are repeated, but using liquid nitrogen dioxide as the solvent in lieu of the sulfur dioxide, the results are similar to those obtained with sulfur dioxide.

EXAMPLE III

When samples of the 70 cetane number reference fuel of Example I and of a light alkylate consisting almost exclusively of isoparaffins are treated as in Example I, but using thiourea in lieu of the urea, instant reactions are obtained with the formation of excellent crystalline complexes. After separation of the complexes from the liquid phases, and regeneration of the constituents of the complexes, the separated hydrocarbons recovered from the complexes are found to be substantially pure isoparaffins and naphthenes in the case of the reference fuel and pure isoparaffins in the case of the alkylate. The residual material from the treatment of the 70 cetane number reference fuel, after purification from any sulfur dioxide, is improved in cetane number.

EXAMPLE IV

When a mixture of a fraction of normal and branched chain alcohols having an average of about 10 to about 14 carbon atoms per molecule, as may be obtained from various operations such as of the so-called Oxo process, is treated with a substantially concentrated solution of urea in liquid sulfur dioxide, a solid complex mixture is formed immediately. Separation of the solid complex from the remaining material and decomposition of the complex by the addition of water yields an aqueous solution of urea and a water-immiscible mixture of normal alcohols free from isomeric alcohols. Separation of the residual alcohol mixture from the sulfur dioxide and excess of urea gives a mixture of alcohols enriched with respect to the iso-alcohols.

EXAMPLE V

When a mixture of a fraction of normal and branched chain fatty acids having an average of about 10 to 16 carbon atoms per molecule, as may be obtained from various processes such as by the catalytic oxidation of a mixture of paraffin hydrocarbons, is dissolved, for example, in normal octane and this solution is treated with a substantially saturated solution of thiourea in furfural, a solid complex mixture is formed almost immediately. After separation of the solid complex mixture from the remaining material, the unchanged fatty acid-normal octane mixture is separated from the solvent solution of excess thiourea and furfural and the octane then distilled from the fatty acids or removed by any other of the well-known methods yielding a mixture of substantially only straight chain fatty acids. By the addition of a solvent of water or methyl alcohol to the separated solid complex, the complex is resolved into a solution of the thiourea in the solvent and a mixture of branched-chain fatty acids substantially free of normal fatty acids.

EXAMPLE VI

When a gaseous mixture of hydrocarbons consisting essentially of cyclopentane and normal pentane (for example in proportions of 50 to 50) is admixed with even a relatively small proportion of gaseous sulfur dioxide (1% or more based on the hydrocarbon mixture) and the resulting admixture is passed upwardly at a relatively high space velocity through a downwardly moving mass of small crystals of solid thiourea the resulting unabsorbed gaseous product (raffinate) is found to be substantially enriched with respect to the normal pentane while the solid thiourea, after separation from the contacting zone, yields, upon heating, a recovered hydrocarbon fraction (adsorbate) in good yield and which is relatively pure cyclopentane. The recovered thiourea is readily recirculated to the contacting zone for further use. Any sulfur dioxide found in either the raffinate or the adsorbate is readily removed by water washing.

EXAMPLE VII

One part by weight of a straight run hydrocarbon distillate having a boiling range of from 370° to 640° F. at atmospheric pressure, and containing principally non-aromatic hydrocarbons comprising straight-chain and non-straight chain paraffinic hydrocarbons as well as some naphthenic hydrocarbons, was agitated with a mixture of about 4 parts by weight of urea and 12 parts by weight of acetic anhydride, while maintaining a temperature of about 25° C. There was a substantially immediate formation of a solid complex of urea and the straight-chain hydrocarbons present in the hydrocarbon distillate. The liquid material was separated from the solid material, and the hydrocarbons in the two separated portions were recovered therefrom. The unreacted hydrocarbon fraction obtained from the separated liquid material contained more than 75% of non-straight chain hydrocarbons while the hydrocarbon fraction recovered from the urea-hydrocarbon complex, by the addition of water thereto sufficient to dissolve the urea, contained substantially only straight-chain hydrocarbons (more than 90% by weight).

This application is a continuation-in-part of copending application Serial No. 738,213, filed March 29, 1947.

I claim as my invention:

1. A process of separating a mixture of organic compounds only some of which are capable of forming solid complexes with an agent selected from urea and thiourea, which process comprises treating said mixture with a complex-forming agent therefor selected from urea and thiourea, and mixtures thereof in the presence of an acid anhydride selected from the group consisting of sulfur dioxide, nitrogen dioxide and acetic anhydride, thereby producing a solid complex of said agent with the complex-forming organic compounds, and separating the resulting solid complex from the remaining organic compounds.

2. A process of separating a mixture of hydrocarbons only some of which are capable of forming solid complexes with an agent selected from urea and thiourea, which process comprises treating said mixture with an admixture of a complex-forming agent therefor selected from urea and thiourea and an acid anhydride selected from the group consisting of sulfur dioxide, nitrogen dioxide and acetic anhydride, thereby producing a solid complex of said agent with at least a portion of the complex-forming hydrocarbons in said mixture and separating said solid complex from the remaining hydrocarbons.

3. A process of separating non-straight chain paraffin hydrocarbons which form solid complexes with thiourea from a mixture thereof with straight chain paraffin hydrocarbons which comprises treating said mixture with an admixture of thiourea and liquid sulfur dioxide thereby producing a solid complex of at least a portion of said non-straight chain paraffin hydrocarbons and thiourea and separating said solid complex from the remaining hydrocarbons.

4. A process of separating normal paraffin hydrocarbons from a mixture thereof with non-straight chain hydrocarbons which comprises treating said mixture with an admixture of urea and liquid sulfur dioxide thereby producing a solid complex of said normal paraffin hydrocarbons and urea and separating said solid complex from the non-straight chain hydrocarbons.

5. A process of separating normal paraffin hydrocarbons from a mixture thereof with non-straight chain hydrocarbons which comprises treating said mixture with urea in the presence of a liquid acid anhydride selected from the group consisting of sulfur dioxide, nitrogen dioxide and acetic anhydride, thereby producing a solid complex of said normal paraffin hydrocarbons and urea and separating said solid complex from the non-straight chain hydrocarbons.

6. A process of separating non-straight chain paraffin hydrocarbons which form solid complexes with thiourea from a mixture thereof with other hydrocarbons which comprises treating said mixture with thiourea in the presence of a liquid acid anhydride selected from the group consisting of sulfur dioxide, nitrogen dioxide and acetic anhydride, thereby producing a solid complex of at least a portion of said non-straight chain paraffin hydrocarbons and thiourea and separating said solid complex from the other hydrocarbons.

7. A process of separating a mixture of hydrocarbons only some of which are capable of forming solid complexes with an agent selected from urea and thiourea, which process comprises treating said mixture with an admixture of liquid sulfur dioxide and a complex-forming agent therefor selected from urea and thiourea thereby producing a solid complex of said agent with at least a portion of the complex-forming hydrocarbons in said mixture and separating said solid complex from the remaining hydrocarbons.

8. A process of separating non-straight chain paraffin hydrocarbons which form solid complexes with thiourea from a mixture thereof with other hydrocarbons which comprises treating said mixture with an admixture of thiourea and acetic anhydride thereby producing a solid complex of at least a portion of said non-straight chain paraffin hydrocarbons and thiourea and separating said solid complex from the other hydrocarbons.

9. A process of separating normal paraffin hydrocarbons from a mixture thereof with non-straight chain hydrocarbons which comprises treating said mixture with an admixture of urea and acetic anhydride thereby producing a solid complex of said normal paraffin hydrocarbons and urea and separating said solid complex from the non-straight chain hydrocarbons.

10. A process of separating a mixture of hydrocarbons only some of which are capable of forming solid complexes with an agent selected from urea and thiourea, which process comprises treating said mixture with a complex-forming agent therefor selected from urea and thiourea, in the presence of acetic anhydride thereby producing a solid complex of said agent with at least a portion of the complex-forming hydrocarbons of said mixture and separating the resulting solid complex from the remaining hydrocarbons.

LLOYD C. FETTERLY.

REFERENCES CITED

The following references are of record in the file of this patent:

UNITED STATES PATENTS

| Number | Name | Date |
|---|---|---|
| 1,830,859 | Schotte et al. | Nov. 10, 1931 |
| 2,300,134 | Priewe | Oct. 27, 1942 |
| 2,376,008 | Riethof | May 15, 1945 |

OTHER REFERENCES

Angla: Compte Rendu, vol. 224, 402–4 (1947).
Bengen: Tech. Oil Mission Reel 143, 6 pages (1946).